T. R. TIMBY.
Car Wheel.

No. 87,445.          Patented March 2, 1869.

Witnesses:
Inventor: Theodore R. Timby

United States Patent Office.

THEODORE R. TIMBY, OF SARATOGA, NEW YORK.

Letters Patent No. 87,445, dated March 2, 1869.

IMPROVED RAILWAY-CAR WHEEL.

The Schedule referred to in these Letters Patent and making part of the same

*To all whom it may concern:*

Be it known that I, THEODORE R. TIMBY, of the town and county of Saratoga, in the State of New York, have invented a new and useful Improvement in Car-Wheels and driving-wheels for dummies for driving street-cars, and for locomotive-engines; and I do hereby declare the following to be a full, clear, and exact description of the same.

The nature of my invention consists in forming mortises in the tread of the wheel, in such a manner as to cause the edges of the mortises to take hold of the rails, thus preventing the wheels slipping, or being retarded in their workings, by means of ice or other causes, and also to cut up and clear the tracks of the ice and other obstructions.

To enable any one skilled in the art to understand the nature of and manufacture my invention, I subjoin the following further description thereof, reference being had to the accompanying drawing, forming part of this specification, and in which—

Figure 1:
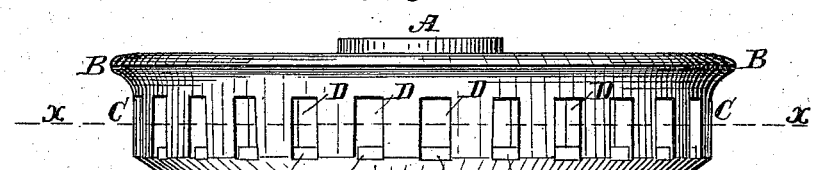

Figure 1 represents a plan view.

Figure 2:
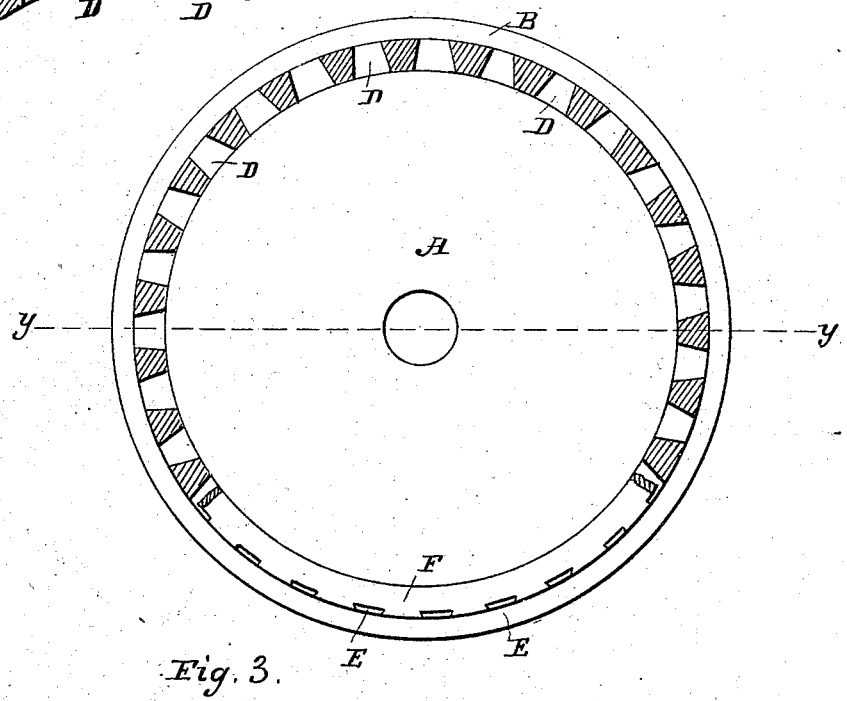

Figure 2, a section on the line $x$ $x$, fig. 1.

Figure 3:
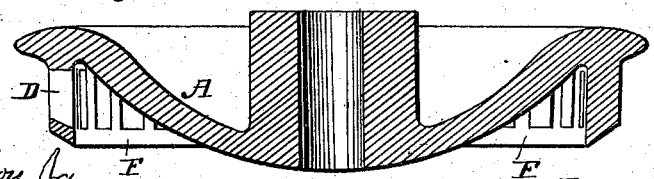

Figure 3, a section on the line $y$ $y$, fig. 2, showing driving-wheels constructed after my improved method.

Figure 4:
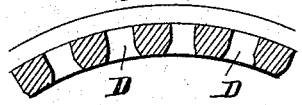

Figure 4, a fragmentary section, showing a modified form of my improvement.

A represents the driving or car-wheel, which may be constructed in the ordinary manner, with a flange, B, and tread, C, which is to rest upon the rails.

The wheel A may be made either of cast, wrought, or chilled iron, steel, or of any other appropriate metal.

The tread C is furnished with mortises D, of any desired shape, placed at intervals around the entire circumference, as represented in the drawings. They may be of any desired form, round, diamond-shaped, or otherwise, but I prefer them constructed as shown in the drawings, fig. 2.

Fig. 4 represents the mortises formed straight for a short distance from the outside, and then flaring inwardly.

The mortises, commencing near the base of the flange B, run outwardly, cutting, by their course, the outer edge of the rim, or tread, not, however, to any great depth. The mortise itself extends completely through the tread, from outer to inner circumference, but always at a sufficient distance from the outer edge of the tread to leave a rim, F, of solid metal, running around on the outside, to connect the mortises, and strengthen the wheel, leaving this rim, however, with the recesses E opposite the outer edge of each mortise. These recesses are to produce the same effect, by cutting the ice and other obstructions, and by taking hold of the track, when, by any reason, the outer edge of the tread is brought to bear upon the rails.

The object of having the mortises in the tread of the wheel is to prevent the wheel from slipping, as before stated, thus avoiding much trouble in slippery weather, while running upon up-grades, drawing heavy loads, or starting the car, or train, and decreasing the wear upon the driving-wheels and rails, which must necessarily occur when the wheels are revolved rapidly upon the track.

The object of having the mortises wedging, with the larger end of the mortise towards the centre of the wheel or hub, is to prevent anything that may chance to be crowded into it, from sticking fast, the flaring inner surfaces permitting it to drop out readily, upon the revolution of the wheel.

Having thus fully explained my invention,

What I claim as new, and for which I desire to secure Letters Patent, is—

A mortise-wheel, A B C, to be used upon street or other railways, constructed with the mortises D in the tread C, substantially as and for the purposes described.

THEODORE R. TIMBY.

Witnesses:
WM. H. BRERETON, Jr.,
W. B. DEMING.